United States Patent
Chakraborty et al.

(10) Patent No.: US 11,841,925 B1
(45) Date of Patent: Dec. 12, 2023

(54) ENABLING AUTOMATIC CLASSIFICATION FOR MULTI-LABEL CLASSIFICATION PROBLEMS WITH LABEL COMPLETION GUARANTEES

(71) Applicant: Amazon Technologies, Inc., Seattle, WA (US)

(72) Inventors: Ria Chakraborty, Bangalore (IN); Pranesh Bhimarao Kaveri, Bangalore (IN); Rohit Kamal Saxena, Bareilly (IN); Chaitra C N, Bangalore (IN); C Manian Gandhi, Remich (LU); Santosh Kumar Sahu, Bangalore (IN)

(73) Assignee: Amazon Technologies, Inc., Seattle, WA (US)

(*) Notice: Subject to any disclaimer, the term of this patent is extended or adjusted under 35 U.S.C. 154(b) by 545 days.

(21) Appl. No.: 17/117,474

(22) Filed: Dec. 10, 2020

(51) Int. Cl.
  *G06F 18/2413* (2023.01)
  *G06N 20/00* (2019.01)
  *G06F 18/21* (2023.01)

(52) U.S. Cl.
  CPC ...... *G06F 18/2413* (2023.01); *G06F 18/2185* (2023.01); *G06N 20/00* (2019.01)

(58) Field of Classification Search
  CPC .. G06F 18/2413; G06F 18/2185; G06N 20/00
  USPC ........................................................ 382/159
  See application file for complete search history.

(56) References Cited

U.S. PATENT DOCUMENTS

| | | | | |
|---|---|---|---|---|
| 10,339,470 B1 * | 7/2019 | Dutta | ................... | G06N 20/20 |
| 10,650,045 B2 * | 5/2020 | Bequet | ................... | G06N 3/084 |
| 11,120,364 B1 * | 9/2021 | Gokalp | ................... | G06N 20/00 |
| 11,520,928 B2 * | 12/2022 | Brannon | ............. | G06F 21/6245 |
| 11,620,568 B2 * | 4/2023 | Moghadam | ............ | G06N 3/045 |
| | | | | 706/12 |
| 2016/0155069 A1 * | 6/2016 | Hoover | ................... | G06Q 30/06 |
| | | | | 706/12 |
| 2016/0267397 A1 * | 9/2016 | Carlsson | ............. | G06F 11/3048 |
| 2017/0116544 A1 * | 4/2017 | Johnson | ................. | G06N 20/10 |
| 2018/0165554 A1 * | 6/2018 | Zhang | .................. | G06F 18/2411 |
| 2020/0184326 A1 * | 6/2020 | Kursun | ..................... | G06N 3/08 |
| 2020/0302340 A1 * | 9/2020 | Durand | .................. | G06N 3/045 |
| 2020/0380212 A1 * | 12/2020 | Butler | ................... | G06F 16/908 |

(Continued)

FOREIGN PATENT DOCUMENTS

| | | | | |
|---|---|---|---|---|
| CA | 2898112 A1 * | 7/2014 | .......... | G06F 16/958 |
| CA | 3111293 A1 * | 4/2020 | .......... | A61B 5/0022 |

(Continued)

*Primary Examiner* — Mahendra R Patel
(74) *Attorney, Agent, or Firm* — K&L Gates LLP

(57) ABSTRACT

Devices and techniques are generally described for content classification. In some examples, first item data representing a first item may be received. The first item data may include a plurality of prediction scores output by a machine learning model. Each prediction score of the plurality of prediction scores may be associated with a respective label of a plurality of labels. In some examples, a set of one or more labels among the plurality of labels may be predicted. The set of labels may be predicted as being applicable to the first item for classification of the first item. A determination may be made that the set of one or more labels represents a complete set of labels applicable to the first item. In some examples, the first item may be classified based on the set of one or more labels.

20 Claims, 10 Drawing Sheets

(56) References Cited

U.S. PATENT DOCUMENTS

| | | | |
|---|---|---|---|
| 2021/0224687 A1* | 7/2021 | Goldszmidt | G06F 18/2415 |
| 2021/0271809 A1* | 9/2021 | Huang | G06F 40/216 |

FOREIGN PATENT DOCUMENTS

| | | | | |
|---|---|---|---|---|
| CA | 3126072 A1 | * | 7/2020 | C12Q 1/6886 |
| CA | 3140835 C | * | 5/2023 | A23L 27/20 |
| CN | 108140143 B | * | 6/2022 | G06K 9/4628 |
| CN | 115885294 A | * | 3/2023 | G06N 5/022 |
| EP | 3745276 A1 | * | 12/2020 | G06F 16/211 |

* cited by examiner

| ID | Predicted Scores | | | | | Actual Label |
|---|---|---|---|---|---|---|
| | Label 1 | Label 2 | Label 3 | Label 4 | Label 5 | |
| 1 | 0.4 | 0.92 | 0.4 | 0.2 | 0.3 | Label 1, Label 2 |
| 2 | 0.1 | 0.3 | 0.2 | 0.3 | 0.2 | Label 2 |
| 3 | 0.4 | 0.6 | 0.99 | 0.8 | 0.1 | Label 3 |
| 4 | 0.1 | 0.1 | 0.3 | 0.1 | 0.85 | Label 5 |
| 5 | 0.3 | 0.2 | 0.87 | 0.5 | 0.1 | Label 3 |
| 6 | 0.2 | 0.1 | 0.2 | 0.1 | 0.2 | Label 5 |
| 7 | 0.3 | 0.2 | 0.2 | 0.7 | 0.4 | Label 4 |
| 8 | 0.56 | 0.3 | 0.2 | 0.25 | 0.1 | Label 1 |
| 9 | 0.33 | 0.78 | 0.9 | 0.2 | 0.4 | Label 2 |
| 10 | 0.92 | 0.2 | 0.4 | 0.1 | 0.3 | Label 1 |
| 11 | 0.1 | 0.2 | 0.2 | 0.4 | 0.9 | Label 5 |
| 12 | 0.3 | 0.93 | 0.97 | 0.1 | 0.5 | Label 2, Label 3 |
| 13 | 0.9 | 0.5 | 0.95 | 0.2 | 0.2 | Label 1, Label 3 |
| 14 | 0.1 | 0.1 | 0.3 | 0.1 | 0.99 | Label 5 |
| 15 | 0.1 | 0.2 | 0.98 | 0.97 | 0.4 | Label 3, Label 4 |

FIG. 2

For Label 3
Valid_combination_list = Label 1, Label 2, Label 4

Subset_predictions

| ID | Label 1 | Label 2 | Label 4 | Actual Label |
|---|---|---|---|---|
| 3 | 0.4 | 0.6 | 0.8 | Label 3 |
| 5 | 0.3 | 0.2 | 0.5 | Label 3 |
| 12 | 0.3 | 0.93 | 0.1 | Label 2, Label 3 |
| 13 | 0.9 | 0.5 | 0.2 | Label 1, Label 3 |
| 15 | 0.1 | 0.2 | 0.97 | Label 3, Label 4 |
| 99th Percentile | 0.899 | 0.896 | 0.797 | |

Single_set

| ID | Label 1 | Label 2 | Label 4 | Actual Label |
|---|---|---|---|---|
| 3 | 0.4 | 0.6 | 0.8 | Label 3 |
| 5 | 0.3 | 0.2 | 0.5 | Label 3 |
| 99th Percentile | 0.399 | 0.596 | 0.797 | |

Multi_set

| ID | Label 1 | Label 2 | Label 4 | Actual Label |
|---|---|---|---|---|
| 12 | 0.3 | 0.93 | 0.1 | Label 2, Label 3 |
| 13 | 0.9 | 0.5 | 0.2 | Label 1, Label 3 |
| 15 | 0.1 | 0.2 | 0.97 | Label 3, Label 4 |
| 99th Percentile | 0.888 | 0.9214 | 0.9546 | |

FIG. 4A

For Label 4
Valid_combination_list = Label 3

Subset_predictions

| ID | Label 3 | Actual Label |
|---|---|---|
| 7 | 0.2 | Label 4 |
| 15 | 0.98 | Label 3, Label 4 |

Single_set

| ID | Label 3 | Actual Label |
|---|---|---|
| 7 | 0.2 | Label 4 |

99th Percentile  0.2

Multi_set

| ID | Label 3 | Actual Label |
|---|---|---|
| 15 | 0.98 | Label 3, Label 4 |

99th Percentile  0.98

FIG. 4B

| 502 → | ID | Label 1 | Label 2 | Label 3 | Label 4 | Label 5 | Actual Label | Auto Classify? |
|---|---|---|---|---|---|---|---|---|
| | 1 | 0.4 | 0.92 | 0.4 | 0.2 | 0.3 | Label 1, Label 2 | N |

| 504 → | ID | Label 1 | Label 2 | Label 3 | Label 4 | Label 5 | Actual Label | Auto Classify? |
|---|---|---|---|---|---|---|---|---|
| | 4 | 0.1 | 0.1 | 0.3 | 0.1 | 0.85 | Label 5 | Y |

| 506 → | ID | Label 1 | Label 2 | Label 3 | Label 4 | Label 5 | Actual Label | Auto Classify? |
|---|---|---|---|---|---|---|---|---|
| | 3 | 0.4 | 0.6 | 0.99 | 0.8 | 0.1 | Label 3 | N |

| 508 → | ID | Label 1 | Label 2 | Label 3 | Label 4 | Label 5 | Actual Label | Auto Classify? |
|---|---|---|---|---|---|---|---|---|
| | 5 | 0.3 | 0.2 | 0.97 | 0.5 | 0.1 | Label 3 | Y |

| 510 → | ID | Label 1 | Label 2 | Label 3 | Label 4 | Label 5 | Actual Label | Auto Classify? |
|---|---|---|---|---|---|---|---|---|
| | 13 | 0.9 | 0.5 | 0.95 | 0.2 | 0.2 | Label 1, Label 3 | N |

| 512 → | ID | Label 1 | Label 2 | Label 3 | Label 4 | Label 5 | Actual Label | Auto Classify? |
|---|---|---|---|---|---|---|---|---|
| | 15 | 0.1 | 0.2 | 0.88 | 0.97 | 0.4 | Label 3, Label 4 | Y |

FIG. 5

ENABLING AUTOMATIC CLASSIFICATION FOR MULTI-LABEL CLASSIFICATION PROBLEMS WITH LABEL COMPLETION GUARANTEES

BACKGROUND

Many classification problems attempt to map items and other content to one or more labels. The associated labels can be used by downstream processes to make certain important decisions related to the items or other content. Historically, such processes were managed manually. However, with the rise of machine learning and other technological advances, automation has been introduced to bring down the cost to classify content. This can be achieved by letting the system automatically classify items without the need for human assistance in the classification task.

BRIEF DESCRIPTION OF DRAWINGS

FIG. 2 depicts a prediction array that may be used in accordance with various embodiments of the present disclosure.

FIG. 4A depicts predicted scores for the valid combinations of a confident label separated into single label sets and multi-label sets, in accordance with various aspects of the present disclosure.

FIG. 4B depicts predicted scores for the valid combinations of another confident label separated into single label sets and multi-label sets, in accordance with various aspects of the present disclosure.

FIG. 5 depicts examples of auto-classification for multi-labeled problems using the profile of FIG. 4C, in accordance with various aspects of the present disclosure.

DETAILED DESCRIPTION

Figure 1:
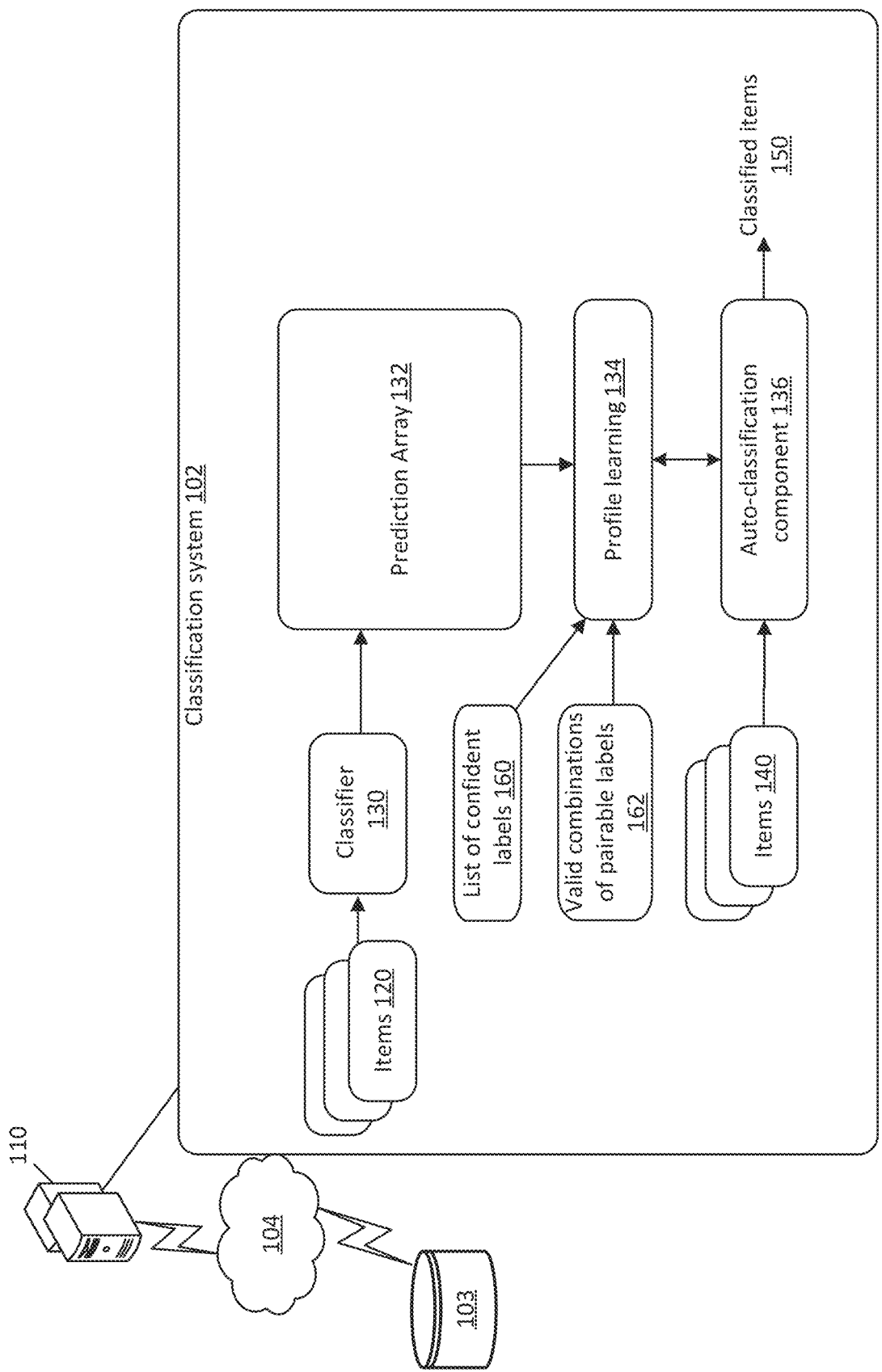
FIG. 1 is a block diagram illustrating a classification system effective to enable classification for multi-label classification problems, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Many classification problems attempt to map items or other content to one or more labels representing aspects (e.g., qualities and/or attributes) of the items. The associated labels are often used by downstream processes to make decisions related to the items and/or content. Historically, such processes have been managed manually using humans to classify items on the basis of manually-annotated labels. However, with the rise of machine learning and other technological advances, automation is being introduced to bring down the cost to classify items and/or other content. In some examples, this can be achieved by letting a classification system automatically classify items without human involvement. While enabling automatic classification for a multi-class classification problem is straightforward, the same is not true for multi-label problem setups. This is because in order to enable automatic classification for multi-label problems, some domains need label completion guarantees—to eliminate risks associated with over/under classified instances. This is particularly problematic since a machine learned model used to arrive at the predictions might not be equally confident about predictions for all available labels for various reasons. These reasons can include data sparsity, high intra-class variation and naturally difficult to model labels.

A typical multi-class classification problem involves allocating an item to one single label from a set of mutually-exclusive labels (where each label represents a particular class). In a more complex scenario, one item can be allocated to more than one label, leading to a multi-label classification problem setup. While enabling automatic classification for a multi-class classification problem is straightforward, the same is not true for multi-label problem setups. This is because, in order to enable automatic classification for multi-label problems, a way of ascertaining whether all the applicable labels have been checked for is needed. This is particularly problematic since the classification model might not be equally confident about all of the available labels for various reasons. Such reasons can include data sparsity, high intra-class variation, and/or labels that are naturally difficult to model.

An example application for this kind of multi-label classification problem is seen in the compliance domain, where the goal is to assign all the relevant "compliance types" to an item, in order for it to be classified. In the compliance domain, the compliance types (represented by the labels) can be used to determine the required lab tests and documents in order to assess an item's compliance status. Missing and/or incorrect labels may give rise to under- or over-classification situations and can result in escalations, increased classification cost, and dissatisfaction.

Many prior approaches focus on design of different machine/deep learning models which ultimately generate the per-label membership prediction scores from features (sometimes, more than one labels are combined together to form aggregated labels—a choice that may not be suitable for certain domains (e.g., for domains where combinations are dynamic). However, prior approaches do not deal with over/under-classification of a given item. In other words, prior approaches do not examine or guarantee label completeness (e.g., dealing with predictions having incorrect or missing labels and methods to prevent those). Label completeness is particularly important in domains which need to have very precise results, and missing/incorrect labels per item have a cost associated with them. In such scenarios, assurance that the predicted results are complete and precise is desirable, even if the recall is not high. The various systems and techniques described herein, may be employed on top of any model/system that generates per-label membership prediction scores. Additionally, the various systems and techniques described herein, enable a soft guarantee around the label completion problem, highlighted above. This ensures that the results vended by the system do not suffer from partial label problems and hence can be used for systems that have high precision requirements.

An example of this is in the Product Compliance domain, where depending on the "compliance types" an item can be associated with, the item is mapped to certain lab tests. Missing one or more "compliance types" can lead to compliance violations (e.g., missing compliance tests), and over-classification means prescription of additional tests, which can cause dissatisfaction among different sellers and/or partners in an online marketplace.

The various systems and techniques described herein address the above problem using a scalable solution that can solve the problem of automatic classification for multi-labelled instances. The various systems and techniques described herein are able to learn the profile of single and multi-labelled instances and determine which items can be auto-classified. The various systems and techniques described herein provide a soft guarantee of label completion for a given item. Enabling automatic classification of content may help reduce the cost to classify on a per-item basis by reducing the inflow volume.

Various techniques are used to classify content in a multi-class classification context, such as problem transformation and label-space partitioning. These approaches provide a different view which attempt to solve the same problem. The most popular approaches within problem transformation are: Binary relevance, label powerset, and classifier chaining. Each of these approaches has its own associated strengths and weaknesses. The various techniques described herein can be used with any multi-class classification systems, without limitation. For example, the various systems and techniques described herein are completely independent of the type of algorithm used to generate the per-class predictions. The problem of auto-classification can be decomposed into two sub-problems: Auto-classification of Single and Multi-labelled instances. In various examples described herein, the systems and techniques use per-label membership probabilities for each item to be classified.

There may be N classes with which items may be associated. Each item may be associated with one or more of the N classes. Predictions may be conceptually thought of as an array of N numbers, with each number ranging from 0 to 1 (although other scales are possible). Predictions for more than one item can be stacked to form an M×N matrix, where M is the number of items. Each prediction signifies the probability of the corresponding class-specific label being applicable for the subject item. Prediction array outputs may associate a list of the N labels (e.g., per-class labels) with a list of items. For example, FIG. 2 depicts a prediction array 132 that includes five columns, each representing a label, and fifteen rows, each representing a different item. The values of the elements of the array (e.g., the intersection of a row and a column) are the predictions for the respective label and the respective item.

As used herein, confident labels are labels for which the machine learning model generating the predictions can predict output (e.g., predictions) that satisfies a defined precision and/or recall requirement. The precision and/or recall thresholds may be domain specific. Each label may have its own prediction threshold for classification. If the prediction for a given item for a given label is greater than the label-specific threshold, the corresponding label is determined to be applicable for the given item.

Confident labels may be either singleton labels or pairable labels. Singleton labels are labels that are expected to occur alone and which are not paired with any other labels. Singleton labels may be derived from domain knowledge and/or from data. Pairable labels are labels that occur with other labels. As described in further detail below, the valid combinations for pairable labels (e.g., the set of other labels with which a given label can be paired) can be determined from domain knowledge and/or from the data.

For some domains, single labeled instances are more prevalent than in other domains. The challenge of classifying items that have single labels associated with them is due to not knowing that the item is a single-labeled instance in advance. Described herein are systems and techniques effective to determine whether a particular instance is single labeled or multi-labeled. The instances can further be tagged with singleton labels and pairable labels.

Figure 4C:
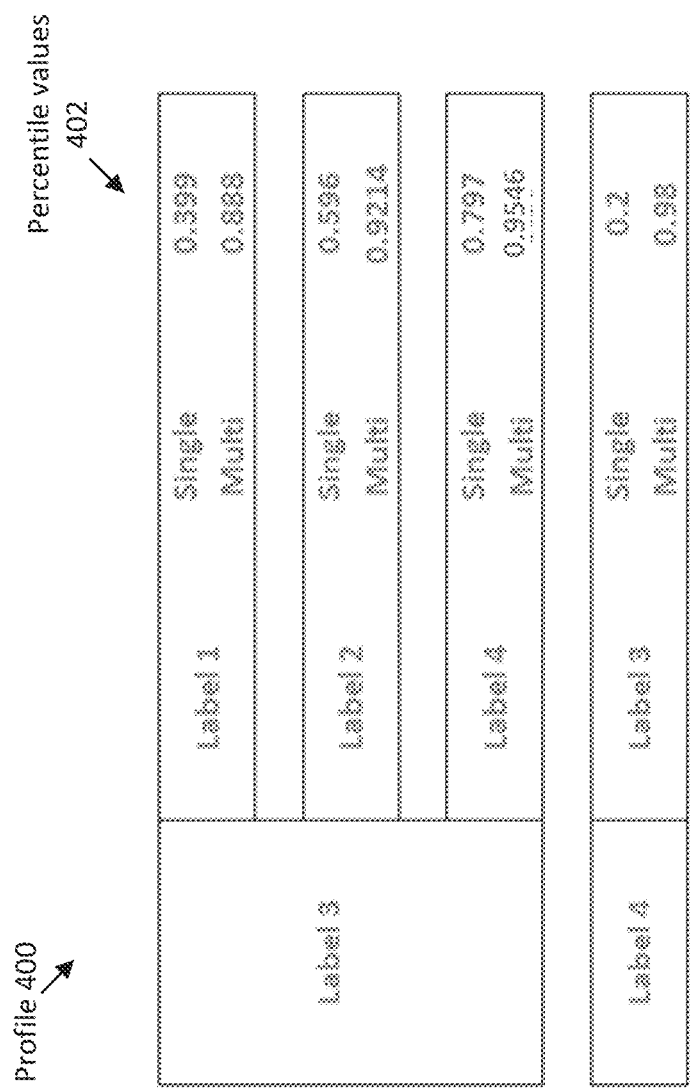
FIG. 4C depicts a profile of confident labels of the prediction array of FIG. 2, in accordance with various aspects of the present disclosure.

In various examples described herein, profile learning is used to select labels that have a generous contribution from single-labeled instances and to learn the profile of each possible combination corresponding to the candidate main label. After obtaining a profile, the earlier-identified list of confident labels can be analyzed and those confident labels where there is a distinct separation in the profile scores between the single-labeled and the multi-labeled instances may be determined. In various examples, instead of using learned profiles, a machine learning model may be used that receives the generated predictions and/or other item attributes as inputs and predicts whether the instance is single or multi-labeled. Profiles may comprise profile data comprising characteristic profile scores for both single-labeled and multi-labeled instances. Characteristic profiles scores may be, for example, 99th percentile (or some other percentile) prediction scores for those instances conforming to a single-label profile, and separate 99th percentile (or some other percentile) prediction scores for those instances conforming to a multi-labeled instance. Example profile data is depicted in FIG. 4C.

FIG. 1 is a block diagram illustrating a classification system 102 effective to enable classification for multi-label classification problems, according to various embodiments of the present disclosure. Classification system 102 may be implemented using one or more computing devices 110 with each of the one or more computing devices 110 including one or more processors. In addition, in various examples, instructions that may be used to program the one or more processors to perform the various techniques described herein may be stored in non-transitory computer-readable memory 103 ("memory 103"). In various examples, memory 103 may be part of the same physical machine as the computing devices implementing classification system 102. In various other examples, the processors of classification system 102 may communicate with memory 103 over a network 104. In various examples, network 104 may be a wide area network, such as the Internet, while in other embodiments, the network 104 is a local area network (LAN) over which classification system 102 may communicate with memory 103 and/or other devices. In some further embodiments, network 104 is a combination of the Internet and a LAN.

Classification system 102 may receive an input set of items 120. Items 120 may be, for example, any set of content (e.g., items) to be classified into one or more different classes (e.g., item categories). In one embodiment, the items 120 may comprise online listings for all items available for purchase via an online marketplace. Items 120 may be sent to a classifier 130 that may generate predictions for each class, for each item. The classifier 130 may be a machine learning model trained for the multi-label classification. For example, classifier 130 may be a binary relevance machine learned model.

Classifier 130 may generate a prediction array 132 for the input items 120. The prediction array 132 may generate a prediction score for each label, for each item. The prediction array 132 may be input into profile learning component 134. Additionally, a list of confident labels 160 and the relevant valid combinations of pairable labels 162 may be input into profile learning component 134. As described in further detail below, profile learning component 134 may be effective to generate a profile of confident labels of the input prediction array 132 based on the prediction array 132, the list of confident labels 160, and the valid combinations of pairable labels 162.

Upon generating the profile, auto-classification component 136 may determine, for a set of items 140 whether the items can be auto-classified or not based on whether the items follow a single labeled profile or a multi-labeled profile. For auto-classification to work for single-labelled instances, the main candidate label is associated with a prediction score that is greater than the defined auto-classification threshold score (for the main candidate label), but the prediction score for pairable labels (e.g., labels that are indicated in the valid combination mapping of pairable labels as being pairable with the main label) are less than the threshold values indicated in the profile.

In various examples, items that are determined to be auto-classifiable by auto-classification component 136 may be classified on the basis of their prediction scores and the applicable thresholds to generate classified items 150. The various systems and techniques described herein provide soft guarantees that the set of labels determined to be applicable to a given items are the complete set of applicable labels for that item.

FIG. 2 depicts a prediction array 132 that may be used in accordance with various embodiments of the present disclosure. As shown in FIG. 2 a list of fifteen items (e.g., the rows of the prediction array 132) are labeled with item identifiers ("ID"). The columns of the prediction array 132 are specific to the per-class labels. In the example prediction array 132 there are five potentially-applicable labels (e.g., Label 1, Label 2, Label 3, Label 4, and Label 5); although it should be appreciated that any number of labels may be used in accordance with the various techniques described herein. The intersection of a label and an item ID represents the prediction score for that label, for that item. For example, item 1 has a prediction score of 0.4 for Label 1, and a prediction score of 0.92 for label 2.

Actual label column 202 represents the actual, ground truth label(s) (e.g., ground truth label data) for the given item. This may be ascertained using domain knowledge and/or historical data. For example, for item 1, label 1 and label 2 are applicable. For item 2, only label 2 is applicable. For item 12, labels 2 and 3 are applicable, etc. As previously described, the prediction array 132 may be generated by a machine learning algorithm (e.g., a deep learning algorithm) trained to determine per-label predictions for items.

Figure 3:
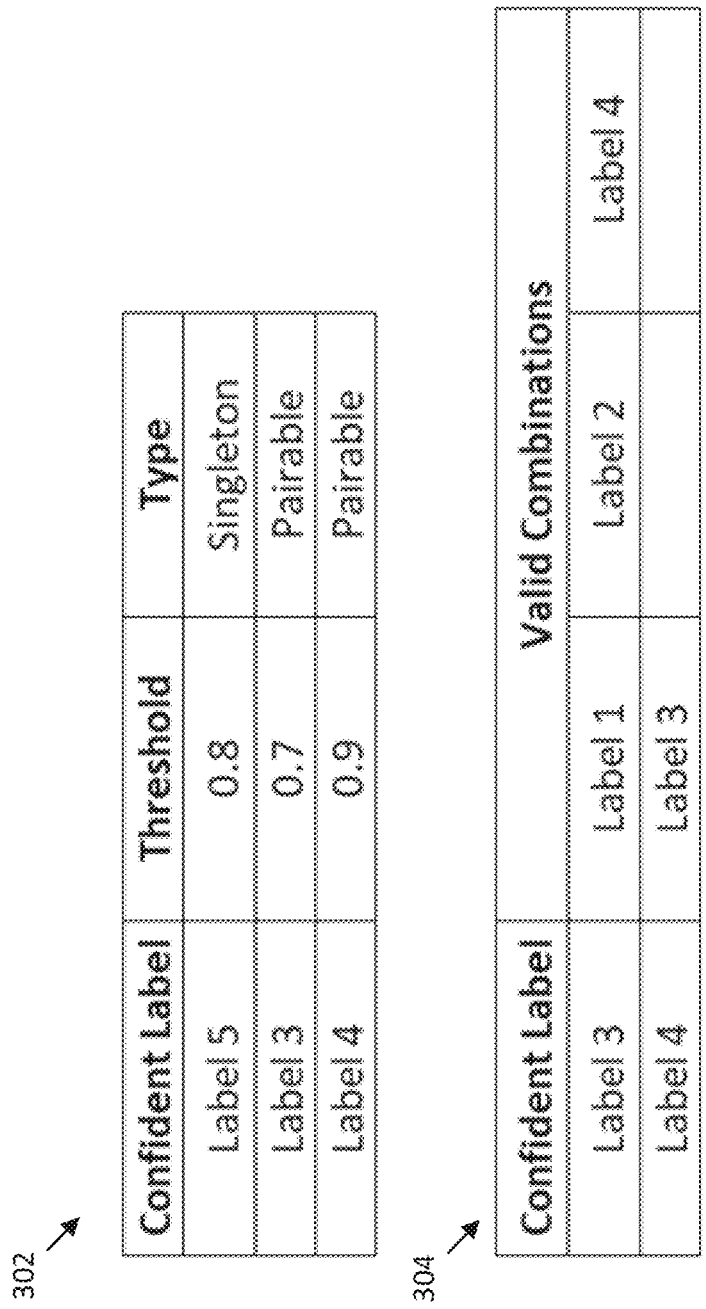
FIG. 3 depicts confident labels and valid combinations of the confident labels of the prediction array of FIG. 2, in accordance with various aspects of the present disclosure.

FIG. 3 depicts confident labels 302 and valid combinations of the confident labels (e.g., valid label combinations) 304 of the prediction array 132 of FIG. 2, in accordance with various aspects of the present disclosure. As previously described, the set of confident labels 302 and the valid combinations of the confident labels 304, along with the prediction array 132 may be inputs to profile learning component 134 that is used to determine a profile of confident labels that may, in turn, be used to determine whether a particular item is auto-classifiable.

In the example of FIG. 3, labels 5, 3, and 4 have been determined to be confident labels. These labels may be confident labels as the machine learning model that generates prediction array 132 may be able to satisfy recall and/or precision requirements for the predictions associated with these labels. As shown in FIG. 3, each of the confident labels may be associated with a label-specific threshold. For example, the threshold for label 5 may be 0.8. This indicates that in order for label 5 to be assigned to a particular item, the prediction score for label 5 for the particular item should be above 0.8 in the prediction array 132. Similarly, the threshold for label 3 is 0.7. This indicates that in order for label 3 to be assigned to a particular item, the prediction score for label 3 for the particular item should be above 0.7 in the prediction array 132. Additionally, for each confident label, a "type" is indicated. The type indicates whether the label is singleton (e.g., the label appears alone without other labels), or whether the label is pairable.

In the example depicted in FIG. 3, label 5 is of the type "singleton." This is because, in prediction array 132, label 5 always appears alone and is not paired with any other labels for a given item in the actual label column 202. Conversely, label 3 is of the type "pairable," because in the prediction array 132, label 3 sometimes appears alone, but sometimes appears in combination with other labels in the actual label column 202. Similarly, label 4 is of the type "pairable," because in the prediction array 132, label 4 sometimes appears alone, but sometimes appears in combination with other labels in the actual label column 202.

The valid combinations of the confident labels 304 displays confident labels that are of the type "pairable" and lists the other labels that are pairable with the confident labels. For example, label 3 is pairable with labels 1, 2, and 4, because label 3 appears either alone or with one or more of labels 1, 2, and 4 in the actual label column 202 of the prediction array 132. Similarly, label 4 is pairable with label 3, because label 4 appears either alone or with label 3 in the actual label column 202 of the prediction array 132.

FIG. 4A depicts predicted scores for the valid combinations of a confident label separated into single label sets and multi-label sets, in accordance with various aspects of the present disclosure. For each of the valid combinations of the confident labels 304, the corresponding predicted scores from the prediction array 132 may be loaded by profile learning component 134. In the example depicted in FIG. 4A, confident, pairable label 3 is evaluated. First, the subset of prediction scores from prediction array 132 are loaded for the subset of items that include label 3 in the actual label column 202. Next, the subset of items are separated into single set instances (e.g., those items that are labeled with label 3 alone) and multi-set instances (e.g., those items that are labeled with label 3 as well as one or more other labels). The k-th percentile (e.g., the 99th percentile) scores corresponding to the combination labels (e.g., those labels that are valid combinations with the subject confident label) for both single and multi-labeled instances are determined and stored in memory.

For example, item 3 is a single set instance as label 3 alone is used to label item 3. Similarly, item 5 is a single set instance as label 3 alone is used to label item 5. For label 3, labels 1, 2, and 4 are valid combination labels as evidenced from the valid combinations of the confident labels 304. The 99th percentile value for label 1 is 0.399 indicating that 99% of items in the dataset have a prediction score at or below 0.399 for label 1, when following a singleton profile labeled with label 3. The examples in FIGS. 4A and 4B use the 99th percentile. However, any value percentile may be selected (e.g., 95th percentile, 90th percentile, etc., as desired) in accordance with the present disclosure. The 99th percentile of label 1, label 2, and label 4 are determined for both the single set and multi-set instances, as shown in FIG. 4A.

FIG. 4B depicts predicted scores for the valid combinations of a confident label separated into single label sets and multi-label sets, in accordance with various aspects of the present disclosure. For each of the valid combinations of the confident labels 304, the corresponding predicted scores from the prediction array 132 may be loaded by profile learning component 134. In the example depicted in FIG. 4B, confident, pairable label 4 is evaluated. First, the subset of prediction scores from prediction array 132 are loaded for the subset of items that include label 4 in the actual label column 202. Next, the subset of items are separated into single set instances (e.g., those items that are labeled with label 4 alone) and multi-set instances (e.g., those items that are labeled with label 4 as well as label 3 (since label 3 is the only valid combination label for label 4)). The k-th percentile (e.g., the 99th percentile) values corresponding to the combination labels (e.g., those labels that are valid combinations with the subject confident label) for both single and multi-labeled instances (e.g., single labeled items and multi-labeled items) are determined and stored in memory.

For example, item 7 is a single set instance as label 4 alone is used to label item 7. For label 4, label 3 is the only valid combination label as evidenced from the valid combinations of the confident labels 304. The 99th percentile value for label 3 is 0.2 indicating that 99% of items in the dataset have a prediction score at or below 0.2 for label 3 for items labeled only with label 4. The 99th percentile of label 3 are determined for both the single set and multi-set instances, as shown in FIG. 4B. Again, the examples in FIGS. 4A and 4B use the 99th percentile. However, any value percentile may be selected (e.g., 95th percentile, 90th percentile, etc., as desired) in accordance with the present disclosure.

FIG. 4C depicts a profile 400 of confident labels of the prediction array of FIG. 2, in accordance with various aspects of the present disclosure. The profile 400 may be a dictionary where the keys are confident labels (e.g., label 3 and label 4). The values are also dictionaries, where the keys are labels from valid combinations. The values are single and multi-set instances and the k-th percentile values corresponding to the particular combination of labels for the relevant single or multi-labeled instance. For example, confident label 3 is associated with valid combination labels 1, 2, and 4. The 99th percentile scores for both single- and multi-set instances for each of the valid combination labels are stored in profile 400 with respect to "main" label 3. Similarly, confident label 4 is associated with valid combination label 3. The 99th percentile scores for single- and multi-set instances for valid combination label 3 are stored in profile 400 with respect to "main" label 4. As described below, the profile 400 may be used to determine whether a complete set of labels has been assigned to a particular item. If so, the item may be auto-classified according to the prediction scores for the item.

FIG. 5 depicts examples of auto-classification for multi-labeled problems using the profile of FIG. 4C, in accordance with various aspects of the present disclosure. Each of the example items 502, 504, 506, 508, 510, and 512 depicted in FIG. 5 may be an item and may have prediction scores for each of labels 1, 2, 3, 4, and 5. Each of the example items 502, 504, 506, 508, 510, and 512 may have an auto-classification flag that may be set to "Y" (yes) or "N" (no) to indicate whether the example item can be auto-classified confidently on the basis of the prediction scores for the item, without manual, human assistance. Although the example items depicted in FIG. 5 are among those of the prediction array 132 of FIG. 2, it should be appreciated that the techniques described herein may be used to determine label completeness and predict auto-classifiability of any items for which a machine/deep learning model has output per-label prediction scores.

For example item 502, none of the predicted scores exceed the confident label thresholds (e.g., the thresholds in confident labels 302 of FIGS. 3—0.8 for label 5, 0.7 for label 3, and 0.9 for label 4). Accordingly, the auto-classification flag may be set to N for example item 502 indicating that this item may not be automatically classified as there is a relatively high likelihood of label incompletion and/or classification error.

For example item 504, the prediction score for label 5 exceeds the relevant confident label threshold (e.g., 0.85>0.8). Additionally, it is known from the list of confident labels 302 of FIG. 3 (and from prediction array 132) that label 5 is a singleton label that appears alone, and not in combination with other labels. Accordingly, example item 504 may be auto-classified. The auto-classification flag may be set to Y for example item 504.

For example item 506, the predicted score for confident label 3 exceeds the confident label threshold (e.g., 0.99>0.7). However, label 3 is a pairable label (see profile 400, FIG. 4) pairable with labels 1, 2, and 4. Accordingly, the prediction scores for labels 1, 2, and 4 are checked to determine if these scores are less than the percentile values (e.g., 99th percentile scores 402) for a single-set profile of profile 400. If so, it is an indication that example item 506 follows the profile of a single-labeled item, labeled with label 3. If not, it is an indication that example item 506 may be a multi-labeled item. The prediction score of label 1, for example item 506, is greater than the 99th percentile score of label 1 in profile 400 (e.g., the 99th percentile score 402 for label 1 in combination with confident label 3 in a single profile is 0.399 and 0.4>0.399). As such, there is a chance that example item 506 is a multi-labeled instance. Accordingly, in order to classify example item 506, the confidence of the combinations is checked. However, since label 1 is not classified as a confident label, label completion cannot be guaranteed. Accordingly, example item 506 may not be auto-classified. The auto-classification flag may be set to N for example item 506.

For example item 508, the prediction score for confident label 3 exceeds the relevant confident label threshold (e.g., 0.87>0.8). However, confident label 3 is a pairable label (see profile 400, FIG. 4). Accordingly, the prediction scores for labels 1, 2, and 4 are checked to determine if these scores are less than the percentile values (e.g., 99th percentile scores 402) for a single-set profile of profile 400. If so, it is an indication that example item 506 follows the profile of a single-labeled item, labeled with label 3. In this example, the prediction score of label 1 (0.3) is less than the 99th percentile single profile score of label 1 in profile 400 (0.399). Similarly, the prediction score of label 2 (0.2) is less than the 99th percentile single profile score of label 2 in profile 400 (0.596). Additionally, the prediction score of label 4 (0.5) is less than the 99th percentile single profile score of label 4 in profile 400 (0.797). Accordingly, there is sufficient confidence that example item 508 is a single labelled instance and the predicted label (Label 3) is the only applicable label. Accordingly, the predictions by the machine learning model for example item 508 represents a complete label prediction case. The auto-classification flag may be set to Y for example item 508.

For example item 510, the prediction score for label 3 exceeds the relevant confident label threshold (e.g., 0.95>0.7). However, confident label 3 is a pairable label (see profile 400, FIG. 4). Accordingly, the prediction scores for labels 1, 2, and 4 are checked to determine if these scores are less than the percentile values (e.g., 99th percentile scores 402) for a single-set profile of profile 400. If so, it is an indication that example item 506 follows the profile of a single-labeled item, labeled with label 3. If not, it is an indication that example item 510 may be a multi-labeled item. The prediction score of label 1, for example item 510, is greater than the 99th percentile score of label 1 in profile 400 (e.g., the 99th percentile score 402 for label 1 in combination with confident label 3 in a single profile is 0.399 and 0.9>0.399). As such, there is a chance that example item 510 is a multi-labeled instance. Accordingly, in order to auto-classify example item 510, the confidence of the multi-label combinations is checked. However, since label 1 is not classified as a confident label (e.g., label 1 is not among the list of confident labels 302), label completion cannot be guaranteed. Accordingly, example item 510 may not be auto-classified. The auto-classification flag may be set to N for example item 510.

For example item 512, the prediction scores exceed the confident label thresholds for two confident labels—label 3 and label 4. For example, the prediction score for confident label 3 (0.98) exceeds the confident label threshold for label 3 (0.7). Additionally, the prediction score for confident label 4 (0.97) exceeds the confident label threshold for label 4 (0.9). Hence, example item 512 is a multi-labelled instance. In order to auto-classify a multi-labeled instance, the prediction score of the valid combinations from profile 400 are evaluated.

For label 3, the valid combination scores of labels 1, 2, and 4 would be checked. However, for confident label 4, only the prediction score of label 3 is checked. The intersection of these two sets yields the result that a check for label 3, alone, is sufficient. Since label 3 is a confident label and the prediction score for label 3 exceeds the confident label threshold for label 3, example item 512 can be auto-classified. The auto-classification flag may be set to Y for example item 512.

Figure 6:
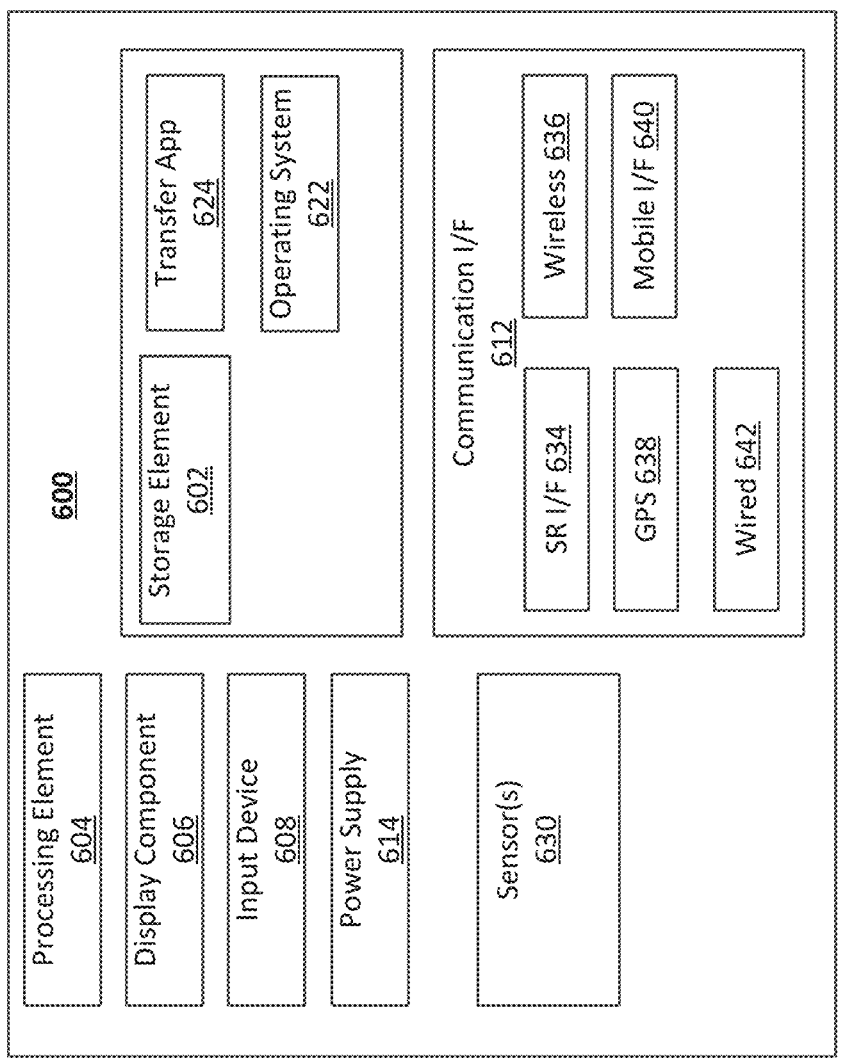
FIG. 6 is a block diagram showing an example architecture of a computing device that may be used in accordance with various embodiments described herein.

FIG. 6 is a block diagram showing an example architecture 600 of a computing device that may be used for automatic classification for multi-label classification problems, in accordance with various aspects of the present disclosure. It will be appreciated that not all devices will include all of the components of the architecture 600 and some user devices may include additional components not shown in the architecture 600. In an example embodiment, the architecture 600 includes one or more processing elements 604 for executing instructions and retrieving data stored in a storage element 602. The processing element 604 comprises at least one processor. Any suitable processor or processors may be used. For example, the processing element 604 may comprise one or more digital signal processors (DSPs). The storage element 602 can include one or more different types of memory, data storage, or computer-readable storage media devoted to different purposes within the architecture 600. In an example embodiment, the storage element 602 comprises flash memory, random-access memory, disk-based storage, etc. Different portions of the storage element 602, for example, are used for program instructions for execution by the processing element 604, storage of images or other digital works, and/or a removable storage for transferring data to other devices, etc. Additionally, storage element 602 may store various matrices, data structures, similarity scores and/or other values determined using the above-described techniques.

The storage element 602 may also store software for execution by the processing element 604. An operating system 622 may provide the user with an interface for operating the computing device and may facilitate communications and commands between applications executing on the architecture 600 and various hardware thereof. In an example embodiment, a transfer application 624 is configured to receive images, audio, and/or video from another device (e.g., a mobile device, image capture device, and/or display device) and/or from a microphone included in the architecture 600.

When implemented in some user devices, the architecture 600 comprises a display component 606. The display component 606 can comprise one or more light-emitting diodes (LEDs) or other suitable display lamps. Also, in some examples, the display component 606 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 606 may be effective to display input images and/or segmentation masks generated in accordance with the various techniques described herein.

The architecture 600 may also include one or more input devices 608 operable to receive inputs from a user. Example input devices 608 include a push button, touch pad, touch screen, wheel, joystick, keyboard, mouse, trackball, keypad, light gun, game controller, or any other such device or element whereby a user can provide inputs to the architecture 600. These input devices 608 may be incorporated into the architecture 600 or operably coupled to the architecture 600 via wired or wireless interface. In some examples, architecture 600 may include a microphone or an array of microphones for capturing sounds, such as voice requests. In various examples, audio captured by a microphone may be streamed to external computing devices via communication interface 612.

When the display component 606 includes a touch-sensitive display, the input devices 608 can include a touch sensor that operates in conjunction with the display component 606 to permit users to interact with the image displayed by the display component 606 using touch inputs (e.g., with a finger or stylus). The architecture 600 may also include a power supply 614, such as a wired alternating current (AC) converter, a rechargeable battery operable to be recharged through conventional plug-in approaches, or through other approaches such as capacitive or inductive charging.

In an embodiment, the communication interface 612 comprises one or more wired or wireless components operable to communicate with one or more other computing devices. For example, the communication interface 612 may comprise a wireless communication module 636 configured to communicate on a network, such as the network 104, according to any suitable wireless protocol, such as IEEE 802.11 or another suitable wireless local area network (WLAN) protocol. In an embodiment, a short range interface 634 is configured to communicate using one or more short range wireless protocols such as, for example, near field communications (NFC), Bluetooth®, Bluetooth LE, etc. In an embodiment, a mobile interface 640 is configured to communicate utilizing a cellular or other mobile protocol. A Global Positioning System (GPS) interface 638 may be in communication with one or more earth-orbiting satellites or other suitable position-determining systems to identify a position of the architecture 600. In an embodiment, a wired communication module 642 is configured to communicate according to the USB protocol or any other suitable protocol.

The architecture 600 may also include one or more sensors 630 such as, for example, one or more position sensors, image sensors, and/or motion sensors. A microphone is shown in FIG. 6, by way of example.

As noted above, multiple devices may be employed in a single system. In such a multi-device system, each of the devices may include different components for performing different aspects of the system's processing. The multiple devices may include overlapping components. The components of the classification system 102, as described herein, are exemplary, and may be located as a stand-alone device or may be included, in whole or in part, as a component of a larger device or system.

Figure 7:
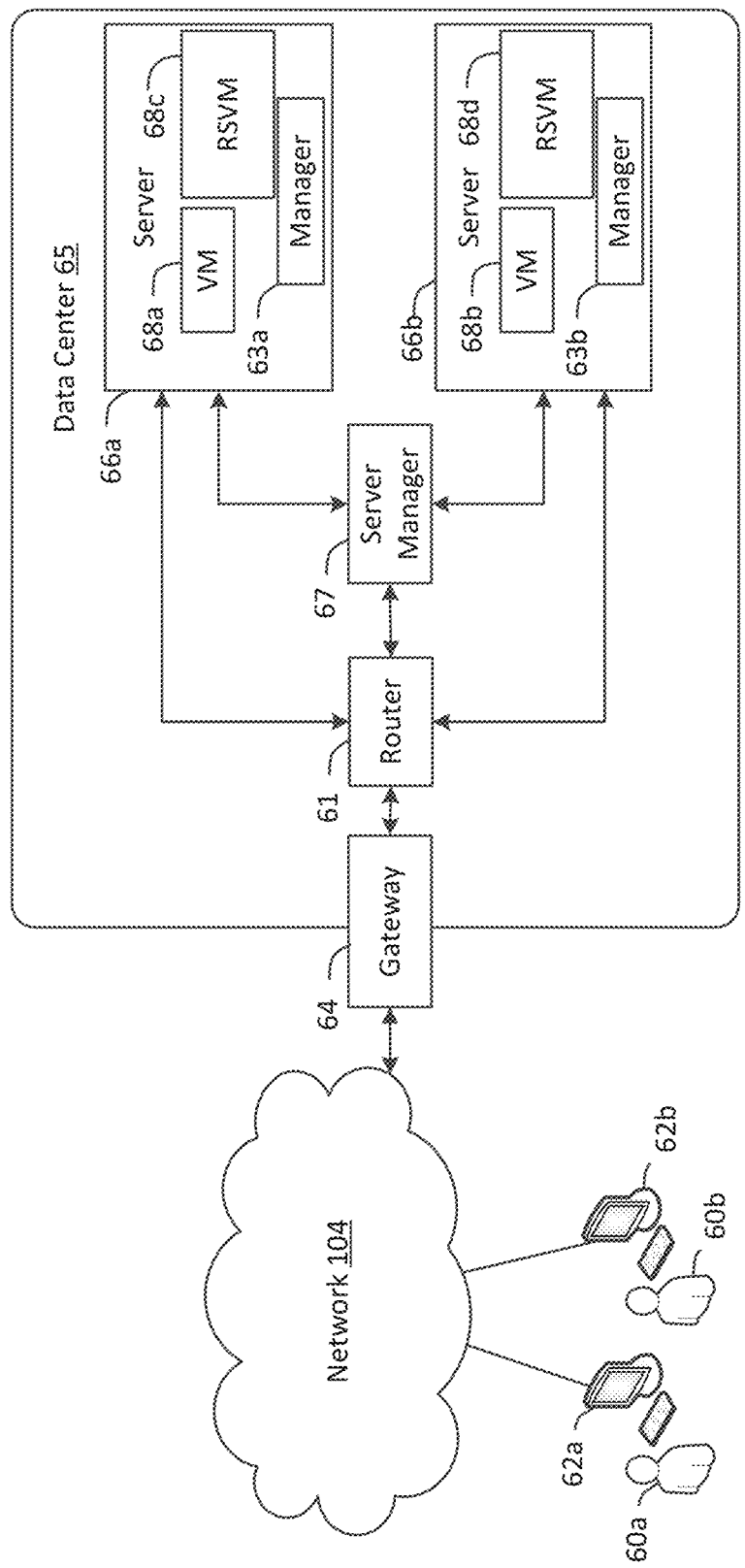
FIG. 7 is a diagram illustrating an example system for sending and providing data that may be used in accordance with the present disclosure.

An example system for sending and providing data and performing various computer processing techniques will now be described in detail. In particular, FIG. 7 illustrates an example computing environment in which the embodiments described herein may be implemented. For example, the computing environment of FIG. 7 may be used to provide ranking of search results as a service over a network wherein one or more of the techniques described herein may be requested by a first computing device and may be performed by a different computing device configured in communication with the first computing device over a network. FIG. 7 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more techniques of the classification system 102, as described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 7 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 7 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 7, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 7, a data center 65 is also employed to at least in part direct various communications to, from and/or between servers 66a and 66b. While FIG. 7 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 65 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems, systems that support various interpreted or compiled programming languages such as Ruby, Perl, Python, C, C++ and the like or high-performance computing systems) suitable for the applications, without, for example, requiring the client to access an instance or an execution platform directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

Figure 8:
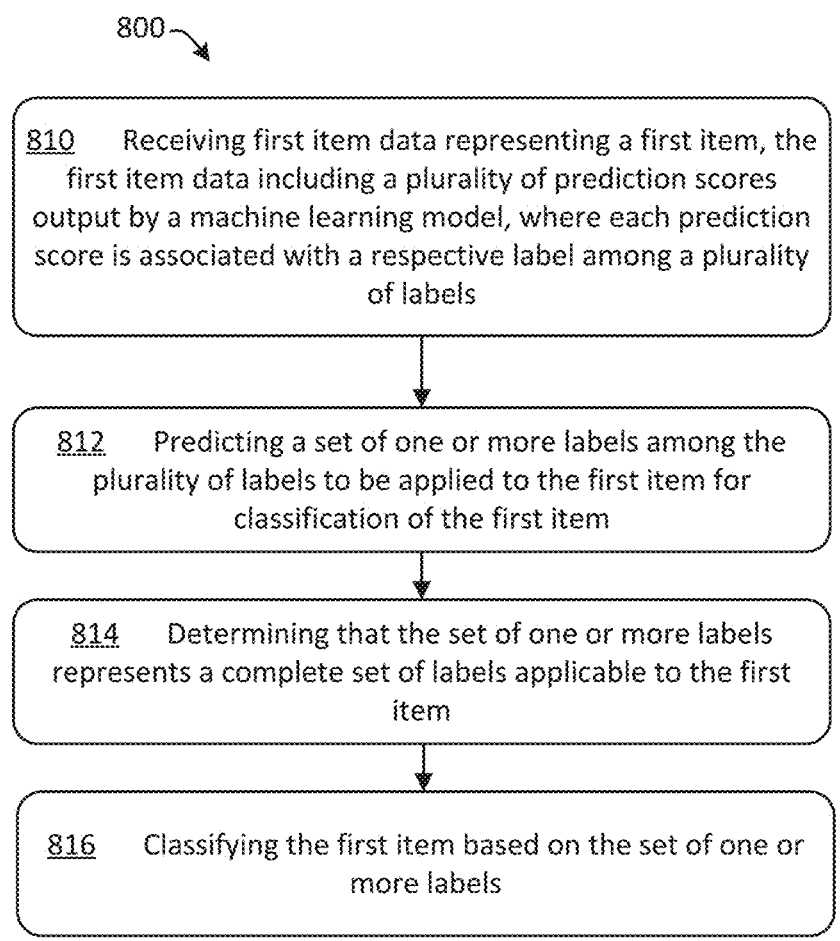
FIG. 8 is a flow chart illustrating an example process for enabling automatic classification in multi-label classification problems, in accordance with various aspects of the present disclosure.

FIG. 8 is a flow chart illustrating an example process 800 for enabling automatic classification in multi-label classification problems, in accordance with various aspects of the present disclosure. Those portions of FIG. 8 that have been previously discussed in reference to FIGS. 1-7 may not be described again for purposes of clarity and brevity. The actions of the process 800 may represent a series of instructions comprising computer-readable machine code executable by one or more processing units of one or more computing devices. In various examples, the computer-readable machine code may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 800 of FIG. 8 may begin at action 810, at which first item data representing a first item may be received. The first item data may include a plurality of prediction scores output by a machine learning model. Each prediction score may be associated with a respective label among a plurality of labels. For example, as seen in FIG. 2, a prediction array may comprise a number of columns, with each column representing a particular label, and a number of rows, with each row representing a respective item. It should be appreciated that in other examples the columns may represent the items and the rows may represent the labels. Additionally, other data structures besides arrays may be used in accordance with the various techniques described herein. Each element of the prediction array may include a prediction score for the relevant label and item.

Processing may continue to action 812, at which a set of one or more labels among the plurality of labels to be applied to the first item for classification of the first item may be predicted. In various examples, the set of labels may include those labels with prediction scores above a threshold prediction score. For example, the labels may include confident labels with a predictions score above a threshold prediction score associated with the particular confident labels. As previously described herein, confident labels may be those labels for which the model generating the prediction scores is able to satisfy some defined precision and/or recall requirements in its predictions.

Processing may continue to action 814, at which a determination may be made that the set of one or more labels represents a complete set of labels applicable to the first item. For example, profile data (e.g., profile 400) may be generated that describes the profile of single-labeled and multi-labeled instances. Accordingly, the prediction scores for the first item may be compared to the relevant scores in the profile to determine whether the prediction scores for the first item follow the profile of a single-labeled instance or a multi-labeled instance at a certain confidence level. Examples are discussed above in reference to FIG. 5.

Processing may continue to action 816, at which the first item may be classified based on the set of one or more labels. For example, if a determination is made that the first item follows the profile of a single-labeled instance. The first item may be classified/categorized according to the prediction score for the relevant single label. In an example, the single label may be a label used to indicate whether the first item is a certain type of medical device. If so, a number of compliance tests may be applicable to the first item.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of content classification comprising:
   receiving first item data representing a first item, the first item data comprising a plurality of prediction scores output by a machine learning model, wherein each prediction score of the plurality of prediction scores is associated with a respective label of a plurality of labels;
   determining profile data comprising characteristic profile scores for single-labeled instances and characteristic profile scores for multi-labeled instances;
   predicting a set of one or more labels among the plurality of labels to be applied to the first item for classification of the first item using the profile data;
   determining, using the profile data, that the set of one or more labels represents a complete set of labels applicable to the first item; and
   classifying the first item based on the set of one or more labels.

2. The method of claim 1, wherein the profile data comprises:
   for a first label among the plurality of labels, data indicating labels pairable with the first label; and
   k-th percentile prediction scores for pairs of labels including the first label.

3. The method of claim 2, wherein the first label is a label for which the machine learning model predicts scores that satisfy at least one of a precision requirement or a recall requirement.

4. The method of claim 1, further comprising:
   generating the profile data comprising, for a first label among the plurality of labels, data indicating labels pairable with the first label.

5. The method of claim 1, further comprising:
   determining that a first prediction score of the first item data is associated with a confident label of the machine learning model; and
   determining that the first prediction score satisfies a threshold score associated with the confident label, wherein the classifying the first item is further based at least in part on the first prediction score satisfying the threshold score.

6. The method of claim 1, further comprising:
   determining that a first prediction score of the first item data is associated with a confident label of the machine learning model;
   determining that the confident label is a label that is not pairable with other labels of the plurality of labels; and
   classifying the first item based on the confident label.

7. The method of claim 1, further comprising:
   determining that a first prediction score of the first item data is associated with a first label of the machine learning model, wherein scores predicted by the machine learning model for the first label satisfy a precision requirement;

determining that the first label is pairable with a second label;

comparing a second prediction score of the first item, the second prediction score being associated with the second label, to a k-th percentile prediction score for predictions of the second label; and determining that the second prediction score is less than the k-th percentile prediction score.

8. The method of claim 7, further comprising determining that the first item is a single labeled item labeled with the first label based at least in part on the determination that the second prediction score is less than the k-th percentile prediction score.

9. The method of claim 1, further comprising:

receiving, from the machine learning model, historical prediction data for a plurality of items, wherein the historical prediction data comprises, for each item, a respective prediction score for each label of the plurality of labels and ground truth label data, the ground truth label data comprising a set of labels assigned to each item among the plurality of labels; and determining, using the historical prediction data, valid label combinations.

10. A system comprising:

at least one processor; and non-transitory computer-readable memory storing instructions that, when executed by the at least one processor, are effective to:

receive first item data representing a first item, the first item data comprising a plurality of prediction scores output by a machine learning model, wherein each prediction score of the plurality of prediction scores is associated with a respective label of a plurality of labels;

determine profile data comprising characteristic profile scores for single-labeled instances and characteristic profile scores for multi-labeled instances;

predict a set of one or more labels among the plurality of labels to be applied to the first item for classification of the first item using the profile data;

determine, using the profile data, that the set of one or more labels represents a complete set of labels applicable to the first item; and classify the first item based on the set of one or more labels.

11. The system of claim 10, wherein the profile data comprises:

for a first label among the plurality of labels, data indicating labels pairable with the first label; and k-th percentile prediction scores for pairs of labels including the first label.

12. The system of claim 11, wherein the first label is a label for which the machine learning model predicts scores that satisfy at least one of a precision requirement or a recall requirement.

13. The system of claim 10, the non-transitory computer-readable memory storing further instructions that, when executed by the at least one processor, are further effective to:

generate the profile data comprising, for a first label among the plurality of labels, data indicating labels pairable with the first label.

14. The system of claim 10, the non-transitory computer-readable memory storing further instructions that, when executed by the at least one processor, are further effective to:

determine that a first prediction score of the first item data is associated with a confident label of the machine learning model; and determine that the first prediction score satisfies a threshold score associated with the confident label, wherein the classifying the first item is further based at least in part on the first prediction score satisfying the threshold score.

15. The system of claim 10, the non-transitory computer-readable memory storing further instructions that, when executed by the at least one processor, are further effective to:

determine that a first prediction score of the first item data is associated with a confident label of the machine learning model;

determine that the confident label is a label that is not pairable with other labels of the plurality of labels; and classify the first item based on the confident label.

16. The system of claim 10, the non-transitory computer-readable memory storing further instructions that, when executed by the at least one processor, are further effective to:

determine that a first prediction score of the first item data is associated with a first label of the machine learning model, wherein scores predicted by the machine learning model for the first label satisfy a precision requirement;

determine that the first label is pairable with a second label;

compare a second prediction score of the first item, the second prediction score being associated with the second label, to a k-th percentile prediction score for predictions of the second label; and determine that the second prediction score is less than the k-th percentile prediction score.

17. The system of claim 16, the non-transitory computer-readable memory storing further instructions that, when executed by the at least one processor, are further effective to:

determine that the first item is a single labeled item labeled with the first label based at least in part on the determination that the second prediction score is less than the k-th percentile prediction score.

18. A method comprising:

receiving first item data representing a first item, the first item data comprising a plurality of prediction scores output by a machine learning model, wherein each prediction score of the plurality of prediction scores is associated with a respective label of a plurality of labels;

determining profile data comprising characteristic profile scores for single-labeled instances and characteristic profile scores for multi-labeled instances;

predicting a set of one or more labels among the plurality of labels to be applied to the first item for classification of the first item using the profile data;

determining, using the profile data, that the set of one or more labels represents a complete set of labels applicable to the first item; and determining that the first item is classifiable using a machine learning classifier based at least in part on the set of one or more labels being a complete set of labels applicable to the first item.

19. The method of claim 18, wherein the profile data comprises:
  for a first label among the plurality of labels, data indicating labels pairable with the first label; and
  k-th percentile prediction scores for pairs of labels including the first label.

20. The method of claim 19, wherein the first label is a label for which the machine learning model predicts scores that satisfy at least one of a precision requirement or a recall requirement.

* * * * *